Patented May 16, 1950

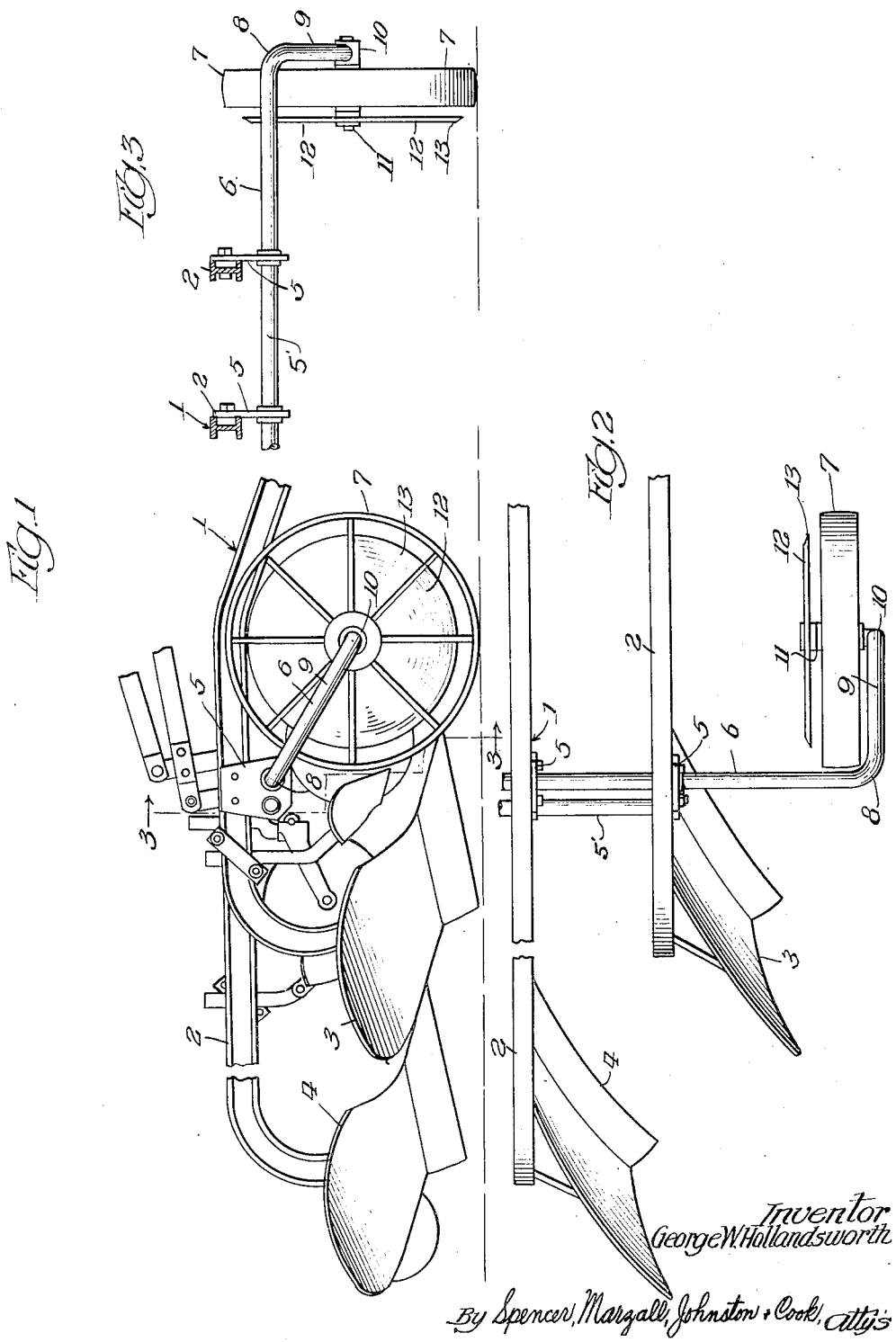

2,508,113

UNITED STATES PATENT OFFICE 2,508,113

TRASH CUTTING DISK ATTACHMENT FOR PLOW WHEELS

George W. Hollandsworth, Knox, Ind.

Application August 23, 1945, Serial No. 612,259

4 Claims. (Cl. 97—129)

This invention relates to plows in general, whether the plow be animal drawn, tractor drawn, or whether the plow be a one-bottom or multiple bottom plow.

It is usual in plows, whether one-bottom or multiple bottom, that there be a disc arranged forwardly of the plow so as to cut the sod immediately in front of the plow. Also, scrapers may be arranged adjacent the disc. Also, it is conventional to provide a cutter coulter adjacent the disc so as to cut up trash, as indicated in Patent No. 2,230,750 to George W. Hollandsworth, issued February 4, 1941, assigned to Brice H. Lantz.

Plows, particularly the multibottom type, and particularly those which are tractor drawn, are supported by wheels extending from the main frame which lies generally centrally between the wheels on each side. The connecting axle from the main frame is generally constructed so as to provide as much clearance as possible between the wheel and axle, the wheel and plow nose, and the axle and plow nose. However, the conventional design and arrangement, while endeavoring to prevent interference between the aforenamed parts and the furrow, permit surface trash to become lodged between the axle, the wheel, the plow, and the furrow, whereby the wheels become jammed, making it necessary for the operator to stop occasionally to remove the gathered compact mass of trash.

The primary object of the present invention is to overcome the inherent disadvantages of conventional plows in that the invention provides for means for preventing the accumulation of trash adjacent the wheels by raising the axle and suspending it over the wheels so that the wheels are mounted inwardly of the axle, as well as providing a circular member, whether flat or dished, adjacent the wheels so as to cut and plow up any trash which may tend to accumulate.

Another important object of the invention is the provision of a revolubly mounted circular member or disc, whether flat or dish shaped, adjacent the supporting wheels of the plow and adapted to be rotatably driven by the traction of the disc with the earth when the plow is propelled so as to prevent the accumulation or lodgment of trash adjacent the wheels by cutting up the trash forwardly of the plow whereby the cut up trash will be deposited in a position to be turned under the soil during the plowing operation.

Numerous other objects and advantages will be apparent throughout the progress of the following specification.

The accompanying drawing illustrates a selected embodiment of the invention and the views therein are as follows:

Fig. 1 is a fragmentary side elevational view of a conventional form of a multibottom tractor drawn plow and embodying the invention;

Fig. 2 is a detail top plan view; and

Fig. 3 is a detail transverse sectional view on the line 3—3 of Fig. 1.

The particular plow herein shown for the purpose of illustrating the invention is a tractor plow of a well known construction, but is constructed so as to embody the invention.

The tractor plow 1 comprises a main frame 2 to which conventional moldboard plows 3 and 4 are secured in the usual manner. The frame 1 carries brackets 5 to support an axle 6. A cross rod 5' may be secured to the brackets 5 to render rigidity thereto. In the conventional plow, the wheels 7, which are mounted to the axle, are secured to the outside end of the axle, the wheels being secured to the extreme outer ends of the axle. The drawing shows the mounting of only one wheel on one end of the axle, the other wheel being mounted on the opposite side of the plow in an identical manner.

In the present embodiment, the axle 6 extends outwardly to the outside of the wheels 7 and is then bent at each end, as indicated at 8, Fig. 2, (only one side being shown) to provide a forwardly extending portion 9 on each end. The axle 6 is again bent inwardly at 10 to provide the hub receiving portion 11 on each end, the portion extending inwardly toward each other and in axial alignment. The wheels 7, therefore, are mounted inwardly of the axle, that is, the axle is in the form of a bail with each extreme end extending inwardly as clearly shown in Figs. 2 and 3. This particular positioning of the wheels with respect to the axle provides considerably more room between the frame part 2 of the plow body and overcomes obstructions between the inside of the wheel and the frame, thereby eliminating the formation or piling up of trash between the inside of the wheel and the axle which is a condition which prevails generally in conventional plows.

The spacing between the wheels 7 is substantially the same but the obstruction of the axle from the main frame to the wheel is eliminated. Therefore, there is clearance between the forward plow 3 and the axle and the wheels. However, in cases where there are high weeds, corn stalks, and other heavy trash, it is desirable that this trash be broken up and bent down so that it will be lodged in a furrow and covered by the soil turning over during the plowing operation.

Means 12 are provided adjacent the inside of the wheels 7 for throwing down and cutting up the trash, as well as to prevent the entanglement of the trash about the wheels and the formation or clods of material from binding the wheels.

The axle 6 may be made in one piece in the form of a bale to carry a wheel on each end, as shown in Fig. 2 (only one wheel being shown), or the axle may be made in more than one piece, just so the inturned ends upon which the wheels are mounted are in axial alignment.

The arrangement of forming the axle in the shape of a bail by turning in the hub part of the axle and mounting the wheels inwardly, as clearly shown in Figs. 2 and 3, normally prevents the formation of trash accumulating about the wheel to foul the wheel. However, at the plow nose of the forward plow, it is extremely desirable to mount the disc 12 with respect to at least one wheel 7. The disc 12 is mounted on the extreme inner end of the hub receiving part 11 of the axle 6 adjacent the moldboard of the leading plow, and this disc 12 extends in close proximity to the inner side of the wheel but a predetermined distance away from the said inner side of the wheel. This disc 12, which is preferably a flat circular piece of metal having a sharpened periphery 13, is revolubly mounted on the hub receiving portion 11 of the axle, and is caused to rotate by traction with the ground as the plow frame or body is propelled along the ground by a tractor or other source of power.

The disc 12, which is preferably flat, but which may be dish-shaped, is positioned interiorly of the wheel to cause trash or other debris to be positioned on the ground to be furrowed under instead of becoming bunched or jammed beneath the axle or around the wheels, or entwined about the axle.

The positioning of the bail axle is such as to extend about the wheel and provide a hub receiving part interiorly of the bail. The arrangement of the bail-like axle provides for greater room or space between the frame, axle, wheels and plow, thereby leaving an unobstructed space so that surface trash or debris or other material will be in position to be plowed under instead of lodging or jamming under the axle and against the wheels.

The disc 12 tends to cut up, bend and push away the debris, and further prevents jamming or bunching up at the wheel and adjacent the leading plow.

The invention provides an improved construction for plows and other farming implements so as to prevent jamming of material, including the plowed soil as well as cutting up surface trash and debris. The construction is applicable to conventional plows in that an axle of the improved type as defined in the application may be easily substituted for the old type axle. Also, the disc 12 may be arranged on the axles of conventional devices, but it is more advantageous to apply the disc in the manner herein shown and described. The invention is efficient in operation, is strong and durable in construction, and may be readily and economically manufactured.

Changes may be made in the form, construction and arrangement of the parts without departing from the spirit of the invention or sacrificing any of the advantages thereof, and the right is hereby reserved to make all such changes as fairly fall within the scope of the following claims.

The invention is hereby claimed as follows:

1. A plow comprising a frame, a transverse bail operatively supported by said frame, said bail comprising a horizontal transverse portion with an integral, angular part extending from each end thereof, an axle part on the outermost end of each angular part and extending inwardly of each said angular part and in axial alignment with each other, a wheel mounted within the confines of the bail on each axle part, and a disc revolubly mounted on at least one of said axle parts adjacent a wheel, the peripheral edge of said disc being spaced inwardly of said wheel.

2. A plow comprising a frame, a transverse bail operatively supported by said frame, said bail comprising a horizontal transverse portion with an integral, angular part extending from each end thereof, an axle part on the outermost end of each angular part and extending inwardly of each said angular part and in axial alignment with each other, a wheel mounted within the confines of the bail on each axle part, at least one said axle part being elongated to form an extension projecting inwardly of a wheel, and a disc mounted rotatably on said extension adjacent said last named wheel, the peripheral edge of said disc being spaced inwardly from said wheel.

3. A plow comprising a frame, a transverse bail operatively supported by said frame, said bail comprising a horizontal transverse portion with an integral, angular part extending from each end thereof, an axle part on the outermost end of each angular part and extending inwardly of each said angular part and in axial alignment with each other, a wheel mounted within the confines of the bail on each axle part, at least one said axle part being elongated to form an extension projecting inwardly of a wheel, and a disc mounted rotatably on said extension adjacent said last named wheel and inwardly thereof, said disc being smaller in diameter than the diameter of the said adjacent wheel, and the peripheral edge thereof being spaced inwardly from the adjacent wheel.

4. A plow comprising a frame, a bail-like member operatively carried by said frame, said bail having a part generally horizontal extending outwardly from the frame, an integral angular part extending from the outermost extremities of the horizontal part, wheel supporting axles turned inwardly from said angular parts and integral therewith, wheels mounted on said axles, and a disc revolubly mounted on at least one axle adjacent a wheel and inwardly thereof, said disc being of lesser diameter than the adjacent wheel, and the peripheral edge of said disc being spaced from said wheel.

GEORGE W. HOLLANDSWORTH.

REFERENCES CITED

The following references are of record in the file of this patent:

UNITED STATES PATENTS

| Number | Name | Date |
|---|---|---|
| 284,810 | Bunch | Sept. 11, 1883 |
| 291,975 | Benson | Jan. 15, 1884 |
| 342,227 | Robinson | May 18, 1886 |
| 729,263 | Boothe | May 26, 1903 |
| 1,725,397 | Hipple | Aug. 20, 1929 |
| 2,008,692 | Elmore | July 23, 1935 |

FOREIGN PATENTS

| Number | Country | Date |
|---|---|---|
| 20,475 | Great Britain | Oct. 4, 1915 |